US012338083B2

(12) United States Patent
Dekocker et al.

(10) Patent No.: US 12,338,083 B2
(45) Date of Patent: Jun. 24, 2025

(54) SYSTEM FOR HANDLING INDIVIDUAL PRIMARY PACKAGING CONTAINERS

(71) Applicant: Anheuser-Busch InBev S.A., Brussels (BE)

(72) Inventors: Wim Dekocker, Leuven (BE); Marcelo Petramale, Leuven (BE); Glenn Ferreira, Leuven (BE); Philippe Jean Marie Duperray, Châteauroux (FR)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 46 days.

(21) Appl. No.: 18/250,711

(22) PCT Filed: Oct. 26, 2021

(86) PCT No.: PCT/EP2021/079728
§ 371 (c)(1),
(2) Date: Apr. 26, 2023

(87) PCT Pub. No.: WO2022/090259
PCT Pub. Date: May 5, 2022

(65) Prior Publication Data
US 2023/0391563 A1 Dec. 7, 2023

(30) Foreign Application Priority Data
Oct. 27, 2020 (BE) ................................. 2020/5757

(51) Int. Cl.
*B65G 54/02* (2006.01)
*B65G 47/90* (2006.01)
*H02K 41/03* (2006.01)

(52) U.S. Cl.
CPC ............. *B65G 54/02* (2013.01); *B65G 47/90* (2013.01); *H02K 41/03* (2013.01); *B65G 2201/0247* (2013.01)

(58) Field of Classification Search
CPC .................... B65G 54/02; B65G 47/90; B65G 2201/0247; H02K 41/03; H02K 41/031; H02K 41/033
(Continued)

(56) References Cited

U.S. PATENT DOCUMENTS 6,868,652 B2  3/2005  Arends et al.
7,134,258 B2  11/2006  Kalany et al.
(Continued)

FOREIGN PATENT DOCUMENTS

BR   PI0402495 B1    2/2016
BR   112019015965 A2  3/2020
(Continued)

OTHER PUBLICATIONS

International Search Report and Written Opinion for Application No. PCT/EP2021/079728 dated Feb. 21, 2022 (18 pages).
(Continued)

*Primary Examiner* — James R Bidwell
(74) *Attorney, Agent, or Firm* — ArentFox Schiff LLP

(57) ABSTRACT

A primary container handling system comprising a transportation unit transporting at least one container handling unit (108) mounted on at least one independently motion controlled mover or levitating tile (106), said container handling unit being configured to provide 3-dimensional translation and/or rotation of an individual primary container.

14 Claims, 4 Drawing Sheets

(58) Field of Classification Search
USPC .................................................. 198/619, 805
See application file for complete search history.

(56) References Cited

U.S. PATENT DOCUMENTS

| | | | |
|---|---|---|---|
| 8,903,540 | B2 | 12/2014 | Stork et al. |
| 9,233,800 | B2 | 1/2016 | Senn et al. |
| 9,309,016 | B2 | 4/2016 | Stork et al. |
| 9,546,049 | B2 | 1/2017 | Lindauer |
| 9,604,792 | B2 | 3/2017 | Wipf |
| 10,150,219 | B2 | 12/2018 | Ridel et al. |
| 10,351,357 | B1 | 7/2019 | Grovijohn et al. |
| 11,001,400 | B2 | 5/2021 | Kalany et al. |
| 2004/0003575 | A1 | 1/2004 | Arends et al. |
| 2012/0085623 | A1 | 4/2012 | Wipf |
| 2013/0026005 | A1 | 1/2013 | Senn |
| 2015/0283708 | A1* | 10/2015 | Crosby ............... B25J 15/0061 |
| | | | 294/81.6 |
| 2021/0229847 | A1 | 4/2021 | Kalany et al. |
| 2021/0253374 | A1* | 8/2021 | Elsperger ............ H02K 41/031 |
| 2021/0380350 | A1 | 12/2021 | Bonnain et al. |
| 2022/0250855 | A1 | 8/2022 | Elsperger et al. |
| 2024/0010442 | A1* | 1/2024 | Winzinger ............ B65G 54/02 |

FOREIGN PATENT DOCUMENTS

| | | |
|---|---|---|
| DE | 69012532 T2 | 5/1995 |
| DE | 102004026455 A1 | 12/2005 |
| DE | 102010018153 A1 | 10/2012 |
| DE | 102011016855 A1 | 10/2012 |
| DE | 102011078555 A1 | 1/2013 |
| DE | 102011083377 A1 | 3/2013 |
| DE | 202013105022 U1 | 2/2014 |
| DE | 102013111088 A1 | 4/2015 |
| DE | 102013112091 A1 | 5/2015 |
| DE | 102016211169 A1 | 12/2017 |
| DE | 202018103487 U1 | 8/2018 |
| DE | 102019115198 A1 | 12/2020 |
| EP | 1462371 A1 | 9/2004 |
| EP | 1803665 B1 | 7/2007 |
| EP | 1530541 B1 | 7/2009 |
| EP | 2338795 B1 | 6/2011 |
| EP | 2411307 A1 | 2/2012 |
| EP | 3105017 A1 | 12/2016 |
| EP | 3181495 A1 | 6/2017 |
| EP | 3317186 A1 | 5/2018 |
| EP | 3405395 A1 | 11/2018 |
| EP | 3577046 A1 | 12/2019 |
| EP | 3778439 A1 | 2/2021 |
| EP | 3842351 A1 | 6/2021 |
| IT | BO20000327 A1 | 12/2001 |
| WO | WO-2014108287 A1 * | 7/2014 .......... B65G 47/082 |
| WO | 2015121668 A1 | 8/2015 |
| WO | 2015163765 A1 | 10/2015 |
| WO | 2017001750 A1 | 1/2017 |
| WO | 2017103813 A1 | 6/2017 |
| WO | 2018001579 A1 | 1/2018 |
| WO | 2018144552 A1 | 8/2019 |
| WO | 2019159117 A1 | 8/2019 |
| WO | 2020126218 A1 | 6/2020 |
| WO | 2020200771 A1 | 10/2020 |
| WO | 2020243814 A1 | 12/2020 |
| WO | 2020244951 A1 | 12/2020 |
| WO | 2021019053 A1 | 2/2021 |
| WO | 2021239768 A1 | 12/2021 |

OTHER PUBLICATIONS

Belgian Search Report and Written Opinion for Application No. 202005757 dated Jul. 8, 2021 (15 pages).

* cited by examiner

SYSTEM FOR HANDLING INDIVIDUAL PRIMARY PACKAGING CONTAINERS

CROSS REFERENCE TO RELATED APPLICATIONS

This application is a national stage filing under 35 U.S.C. § 371 of International Patent Application No.: PCT/EP2021/079728, filed Oct. 26, 2021, which claims priority to Belgium Patent Application No. BE2020/5757, filed Oct. 27, 2020, the entire contents of each of which is incorporated by reference herein.

FIELD OF INVENTION

The present invention generally relates to methods and systems including transportation units equipped with container handling units for processing packages. More particularly, the present invention relates to methods, systems and related machines with container handling units for transferring and orienting individual primary packaging containers.

BACKGROUND OF INVENTION

For handling, treating, loading/unloading and performing other such processing steps e.g. filling, rinsing, capping, labelling, inspecting, on primary packaging containers, many processing methods, systems and related architectures have been conventionally executed. Such processing systems generally include one or more transportation units equipped with conventional means of handling the packaging containers, and thereby move and establish and maintain the pitch and velocity of the packaging containers from one place to another, or one machine to another, or one conveyor to another conveyor etc.

A general problem of the conventional architectures for primary containers is that they repeatedly gain and then give up individual control of the primary containers, cycling repeatedly between periods of buffer, bulk (en-mass), multi-lane, single file handling and then transitioning via a timing or pitch setting device such as an infeed scroll (worm) to individual primary container handling through the process at fixed pitch. The latter involves hand-off from the infeed timing device, such as a scroll (worm) to typically star wheels and guides for infeed, handling through and outfeed from the primary container processing machines, such as rotary cleaning or rinsing equipment, liquid filling machines, capping and labelling machines.

Scroll (worm), star wheel and guide architectures in container handling process systems are usually bulky, especially for high capacity machine, with large foot prints, and have complex machine structures and drives. Further, such scroll, star wheel and guide architectures may be challenging for personnel to access various parts or components of the processing machines, occupy more space and do not allow ease in retrieval or changing of parts A second general problem of conventional primary container handling systems, such as scrolls (worms) star wheels and guides, is that they are unable to differentiate between various sizes and shapes of primary containers. As a consequence, the changing of parts becomes a necessary step in reconfiguring the processing systems, for each different diameter, skirt and/or shoulder height and shape of primary packaging container, resulting in lost production time and impacting productivity.

Further, an additional disadvantage, particularly related to scroll, star wheel and guide architectures, is that the timing scrolls (or worms) tend to slide over the packaging container surfaces while handling them. This may result in spoiling the surfaces (especially surface treated, textured surface finishes such as etching (frosting)), scratching the surface or spoiling the labels etc. on the surfaces, especially if grit or glass fragments have become embedded in the surfaces of the container handling change parts. In addition, line pressure queuing, entry into and handling by scrolls (worms) and star wheels and guides often results in high impact events, shocks and light through heavy loading of container to container and/or container to container handling part contact which limits attempts to reduce the wall thickness and hence the light weighting of containers.

In an attempt to replace star wheel based infeed and outfeed configurations for primary containers, US2013026005A1 provides a transporting apparatus comprising a transporting path which has its entire length arranged between a first and second container-handling arrangement and along which the containers can be transported by transporting elements such as clamps, wherein the pitch and pace of the transporting elements compensate for a difference in speeds of transportation of the containers in the first and second container-handling arrangements.

In the above attempt, although transporting elements are synchronized with the pitch and pace of first and second container-handling arrangements, the transporting elements are still unable to differentiate between various sizes and shapes of various packaging containers.

A third general problem in conventional primary container process is that, in case a processing step requires a particular primary container orientation or relative position different from the orientation or relative position at the infeed, for example labelling, complex tooling is required within the primary container processing machine to obtain the required orientation or relative position at capacity.

Considering the above, it is a first objective of the present invention to provide a flexible, efficient, high capacity, space saving, productivity enhancing solution which can process a wide range of primary packaging types, shapes and sizes and which eliminates the need for change parts.

Further, it is an objective of the present invention to remove operational constraints in terms of firm but gentle primary container handling, manipulation, pitch and pace synchronized transportation, orientation, positioning and movement, to, through, opposite, between and out of a process station and/or multiple process stations, be they static or dynamic (capable of performing the process while in synchronized motion and executing the process while in transit).

It is also an objective of the present invention to provide a programmable, recipe driven, dynamic handling system that can implement one or more adaptable container handling units in one or more processing operations depending on the type of products to be processed or operated upon.

It is also an objective of the present invention to provide an overall processing system which is compact, adaptive, coupled with digitalized solutions, and which eliminate the need for primary container specific change parts.

It is an objective of the present invention to provide smart, adaptive tooling for primary container handling which are easily optimizable via programming to realize software driven flexibility in the overall processing machine.

It is an objective of the present invention to achieve nimble flexibility at capacity for an efficient processing of an exceptionally wide range of primary packaging container types, shapes, sizes, formats and assembly sequences, including the handling of non-circular cross section primary containers, via synchronized, adaptive container handling units in pitch optimized, motion-controlled transit.

It is an objective of the present invention to provide packaging and treatment machines for treating individual primary containers. A consequence of individual treatments is further also that container to container contact during transfer and/or processing may be reduced, or even eliminated, that scroll (worm) and star wheel and guide configurations may be avoided, and therefore that the containers are not subject to impacts and extreme forces due to shocks, that forced container to container contact is eliminated, that handling forces are significantly reduced overall and thus all the associated damage and spoilage avoided associated with pressure, impact and shear forces are eliminated. Achieving this would enable progress in light weighting the containers as part of measures to lower packaging material costs, reduce material consumptions and make advancements in sustainability.

Additional objective of the invention is to remove the throughput, range, inefficiencies and operational constraints of traditional processing machinery and systems to overcome restrictions in packaging design and limited range of styles and formats offered by conventional, commercially available solutions.

SUMMARY OF THE INVENTION

According to the disclosure is a primary container handling system comprising a transportation unit transporting at least one container handling unit mounted on at least one independently motion controlled mover or levitating tile, said container handling unit being configured to provide 3-dimensional translation and/or rotation of an individual primary container.

The container handling unit may comprise a gripper for at least temporarily holding and releasing an individual primary container and, optionally, the gripper is adapted for primary container neck and/or body gripping and/or top gripping and/or bottom gripping/supporting.

The container handling unit may comprise a plurality of grippers, each gripper being adapted to individually translate and/or rotate within the container handling unit.

The gripper may comprise at least one gripper set comprising a set of fingers or claws of which at least one is actuated to dynamically grip, clamp or hold the primary container.

Where used herein, 3-dimensional translation and/or rotation may comprise movement in at least three of the following six degrees of freedom:
 translation along a X axis, parallel to a machine direction of the system;
 translation along a Y axis, perpendicular to the X axis;
 translation along a Z axis, perpendicular to the X and Y axes;
 rotation about the X axis;
 rotation about the Y axis; and
 rotation about the Z axis.

The 3-dimensional translation and/or rotation of an individual primary container may comprise:
 translation along and/or rotation about the X axis; and
 translation along and/or rotation about the Y axis; and
 translation along and/or rotation about the Z axis.

The container handling unit may be configured to provide movement in each of the degrees of freedom in which movement is provided independently of movement in any of the other degrees of freedom.

That is, the container handling unit is configured to provide movement in any degree of freedom, or any amount, irrespective of whether movement is being provided in one of the other degrees of freedom. A user is able to control the movement of the handling unit in each degree of freedom independently of the other degrees of freedom.

The extent of translation or rotation may be selectable from a continuous range of possible translations or rotations.

The 3-dimensional translation and/or rotation may be relative to the at least one independently motion controlled mover or levitating tile on which the container handling unit is mounted.

The transportation unit may be configured to move relative to an adjacent primary container transportation unit, or relative to a primary container processing station.

The container handling units may be wirelessly controllable and/or wireless powered and/or position sensed.

The system may comprise a control system enabling the control of the 3-dimensional movement of the individual primary containers relative to an adjacent primary container transportation unit, or relative to a primary container processing station.

The container handling unit may comprise a control system configured to receive instructions and actuate the container handling unit to translate and/or rotate the individual primary container.

Further according to the disclosure is a primary container processing system comprising a primary container handling system in accordance with any of the above claims and further comprising at least one adjacent primary container transportation unit and/or at least one primary container processing station; wherein the transportation unit is configured to move relative to the primary container processing station.

The primary container processing station may comprise a transportation unit transporting a number of container processing units, each container processing unit of which being mounted on or integrated into independently motion controlled, rail mounted, movers or levitating tiles and the mounting of each container processing unit having means for up to 3-dimensional translation and/or orientation of an individual container processing unit, relative to the rail mounted mover or levitating tile.

A primary container handling system may be provided comprising a transportation unit transporting at least one container handling unit mounted on at least one independently motion controlled mover or levitating tile, said container handling unit having means for 3-dimensional translation and/or rotation of an individual primary container.

The means for 3-dimensional translation and/or rotation of an individual primary container may be adapted for enabling any 3-dimensional displacement along and/or around the primary container X, Y, Z axes.

3-dimensional translation may include translation along a horizontal axis (X), e.g. variability in position in a direction parallel to the transportation unit machine direction, and along a vertical axis (Z), e.g. variability in height relative to the transportation unit, and along a second horizontal axis (Y), e.g. variability in position in a direction perpendicular to transportation unit machine direction.

A means for 3-dimensional translation and/or rotation of an individual primary container may be adapted for enabling any 3-dimensional displacement of an individual primary container including translation along and/or rotation about a horizontal axis (X), and along and/or about a vertical axis (Z), and along and/or about a second horizontal axis (Y).

Any such 3-dimensional displacement of an individual primary container may be relative to the mover or levitating tile, and/or relative to the transportation unit, and/or relative to an adjacent primary container transportation unit and/or relative to a primary container processing station.

The means for 3-dimensional translation and/or orientation of an individual primary container may be applied to translate the primary container along the X, Y, Z, axes and/or to rotate the container about the axes, thus controlling the pitch, yaw, and/or roll about the X, Y, Z axes, respectively, and so as to incline, tilt, pivot, shake, vibrate, invert or otherwise rotate or even spin the primary container, in any combination thereof, resulting in 3-dimensional articulation.

The means for 3-dimensionally translation and/or rotation may comprise holding means or a gripper for at least temporarily holding and releasing an individual primary container. Such holding means may comprise any type of means for gripping or clamping or supporting or levitating or suspending an individual primary container.

The means for 3-dimensional translation and/or rotation may comprise a plurality of holding means or grippers enabling 3-dimensional translation and/or rotation of more than one individual primary container simultaneously. Each holding means or gripper is adapted to individually translate and/or rotate within the container handling unit, thereby enabling picking a number of primary containers and grouping or re-grouping and/or orientating within the container handling unit while transporting and before dropping.

The holding means or gripper may be adapted for primary container neck and/or body gripping and/or top gripping and/or bottom gripping or supporting.

The holding means or gripper may comprise at least one gripper set comprising a set of fingers or claws of which at least one is actuated to dynamically grip, clamp or hold the primary container.

A primary container handling system may be provided wherein said holding means or gripper is adapted for moving the individual primary container including inclining, or tilting, or rotating, or spinning, or hinging, or inverting, or lifting/lowering, or articulating/retracting an individual primary container relative to one or more of its X, Y, Z axes, or any combination thereof (i.e. along and/or about the X, Y, Z, axes, respectively).

The container handling units may each enable moving an individual primary container within six degrees of freedom relative to the transportation unit.

The container handling unit may be adapted for orientation and/or identification or quality control sensing, orienting, inspecting, weighing, illuminating, heating, cooling, vibrating, shaking, pressurizing, forcing, or measuring an individual primary container, or any combination thereof.

The container handling units may be automatically, self-adjusting in terms of the size and the position of the container handling end-effectors or otherwise be adjustable via one or more change stations located along the track of the rail mounted movers or within the range of the levitating tiles, such that containers of different size, shape and height may be easily, efficiently and optimally accommodated, without the need for change parts.

The transportation unit may preferably be a closed loop transportation unit (i.e. closed loop including virtual closed loop or otherwise recirculating system).

A primary container handling system may be provided having means for moving the transportation unit relative to an adjacent primary container transportation unit, or relative to a primary container processing station or transportation unit mounted series of processing stations movingly configured to operate in synchronized motion, pitch and pace, to that of the movers or levitating tiles of the primary handling transportation unit, or vice versa, such that operations in transit occur. In such case, a movement of the transportation unit itself may contribute to the 3-dimensional translation and/or rotation of the individual primary containers. Alternatively, an adjacent primary container transportation unit, or a primary container processing station may have means for moving relative to the primary container handling system.

The container handling units may be wirelessly controlled and/or wireless powered) and/or position sensed.

A primary container handling system may further comprise a control system enabling the control of the 3-dimensional movement of the individual primary containers relative to an adjacent primary container transportation unit, or another transportation unit or relative to a primary container processing station or transportation unit mounted series of processing stations movingly configured to operate in synchronized motion to that of the movers or levitating tiles of the primary handling transportation unit, or vice versa, such that operations in transit occur. Such control system may additionally enable the control of the movement of the transportation unit relative to any of the aforementioned adjacent stations, conveying or transportation units.

The number of container handling units may be adapted to handle a primary container opposite to processes for orientation and/or identification or quality control sensing, orienting, labelling, coding, printing, inspecting, weighing, illuminating, surface treating, etching, hardening, heating, cooling, vibrating, pressurizing, forcing, or measuring, or any combination thereof, while the individual primary containers are in transit.

A primary container processing system may be provided comprising a primary container handling system as described throughout this text and further comprising at least one adjacent primary container transportation unit and/or at least one primary container processing station. Such primary container processing system may be part of a machine for one or any combination of rinsing, filling, capping, orienting, decorating, inspecting, scanning, weighing, cutting, trimming, polishing, coating, hardening, etching, printing, surface treating, pressing, forcing, pressurizing/evacuating, vibrating, heating, cooling an individual primary container.

In an embodiment of the present invention, a primary container processing system may be provided comprising a primary container handling system as described throughout this text and at least one primary container processing station, wherein said container processing station comprising a transportation unit transporting a number of container processing units, each container processing unit of which being mounted on or integrated into independently motion controlled, rail mounted, movers or levitating tiles and the mounting of each container processing unit having means for up to 3-dimensional translation and/or orientation of an individual container processing unit, relative to the rail mounted mover or levitating tile.

The means for 3-dimensional translation and/or orientation of an individual container process unit may be adapted for any 3-dimensional displacement of an individual container process unit, relative to the mover or levitating tile, along and/or around its X, Y, Z axes, or any combination thereof.

The means for 3-dimensional translation and/or orientation of an individual container process unit by the mover or levitating tile mounted tooling, may be applied to translate the individual container process unit along one or more of the X, Y, Z, axes and/or to rotate the container about one or more of the said tooling axes, thus controlling the pitch, yaw, and so as to incline, tilt, pivot, invert or otherwise rotate or even spin the individual container process unit, in any combination thereof, resulting in 3-dimensional articulation.

The individual container processing units may be wirelessly controlled and/or powered (untethered) and/or position sensed.

The primary container processing system may preferably be a closed loop transportation unit (i.e. closed loop including virtual closed loop or otherwise recirculating system)

The individual container process unit may be adapted opposite the primary container handling system for appropriate and controlled presentation of the individual process devices and/or sensors relative to the individual primary containers that processes of identification or quality control sensing, orienting, labelling, coding, printing, inspecting, weighing, illuminating, surface treating, etching, hardening, heating, cooling, vibrating, pressurizing, forcing or measuring etc. or any combination thereof, are optimally executed.

DETAILED DESCRIPTION

Figure 1:
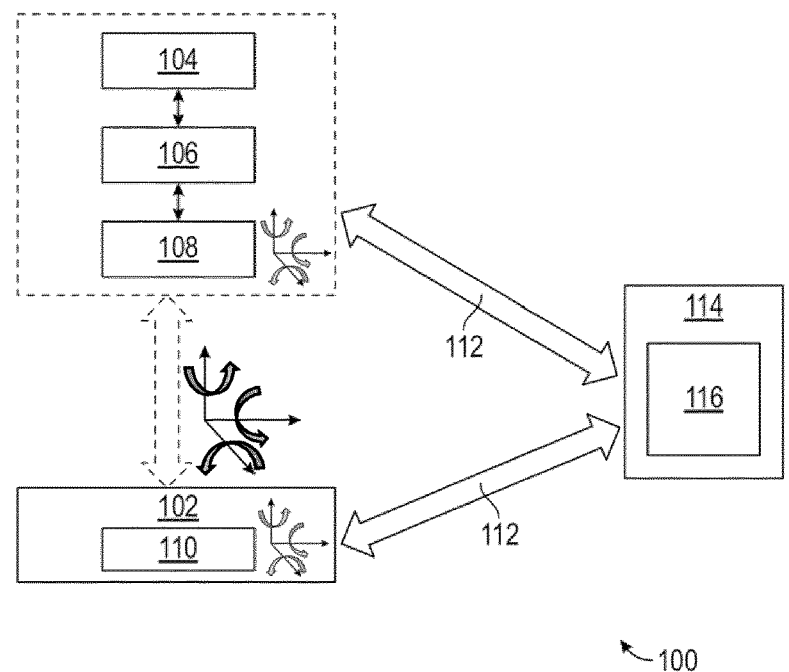
FIG. 1 illustrates a primary container processing system in accordance with the present invention. The processing system includes a primary container handling system for transporting and orienting primary containers relative to an adjacent primary container transportation unit or primary container processing station.

A handling system comprises at least one transportation unit equipped with a plurality of independently motion controlled movers or tiles, which are further mounted with a number of container handling units.

At least one, preferably each container handling unit has a handling means for up to 3-dimensional translation and/or rotation of an individual primary container which is stationary or moving on the transportation unit.

The mover or tile moves relative to the transportation unit. In the case of the tile, the tooling may move along and/or about 3-dimensions relative to the tile and the tile may move in 3-dimensions relative to the levitating surface which it itself may be mounted in an orientation in any plane relative to the machine frame standing on eg. the floor of the packaging hall, and which may further more be freely shape along and about any of the global X, Y, Z axes, relative to the machine frame (packaging hall building).

The container handling units include holding means, or grippers, for at least temporarily holding and releasing an individual primary container. Such holding means or grippers may comprise any type of means for gripping or clamping or supporting or levitating or suspending an individual primary container. The holding means or grippers may be adapted for primary container neck and/or body gripping and/or top gripping and/or bottom gripping/supporting. Particularly, each holding means or grippers comprise at least one gripper set comprising a pair of fingers or claws of which at least one is powered for dynamically gripping a container.

In an embodiment, the holding means or grippers grips or otherwise attaches (e.g. by suction) to the primary container from or at its neck and/or body and/or top and/or bottom gripping/supporting.

The transportation unit may be either a rail mounted independent mover based system and/or levitating tile based system.

The holding means are mover or tile mounted and preferably bespoke, light weight, durable, custom mechanisms which may be inductively powered and/or wirelessly controlled that far ranging, untethered operation may occur as the devices are transported in an independent motion controlled manner by the transportation unit.

The container handling units may be either attached (mounted) on the movers or tiles of the rail mounted independent cart or levitating tile systems, respectively, or integrated into the body construction of those units.

The transportation units drive the plurality of movers and/or tiles in individual motion controlled manner.

Each independent, motion controlled, rail mounted mover or levitating tile is equipped with a highly responsive, deterministic, wireless client transmitter/receiver enabling untethered machine automation control of smart container handling units mounted on and/or integrated therein.

Each independent, motion controlled, rail mounted mover or levitating tile is serviced with an inductive power supply for the powering smart container handling units mounted on and/or integrated therein.

The container handling units may further include a number of energized components such as motors, pumps, compressors, vacuum pumps, solenoids, electric actuators, heaters, coolers, exciters (vibration inducers), vibration dampeners (noise and vibration suppressors), lasers, ultrasonic generators, UV light emitters, illumination, electrostatic grippers and all manner of feedback measurement sensor transmitters and switches etc.

Dependent on the type, shape and size of the primary container to be handled and/or the process operation to be executed, the handling unit may be manually, semi-automatically or automatically exchanged that the fixtures and/or the energized and wirelessly controlled devices on the independent, motion controlled rail mounted movers or levitating tiles may be further fit for purpose and optimized for an extended range of different operations within the same handling system.

In addition to the holding means, the primary container handling units may optionally comprise additional tooling, either self adjusting or settable via a change station to accommodate the processing different types, shapes and sizes of primary containers for one or more different processes.

Upon connection with the movers or tiles, the container handling units and optional tooling would typically be auto-recognized by the process control system and automatically connected to power and automation control utilities available therein.

The container handling system is adapted for performing one or more types of transportation and rotation operations on the primary container, for example the container handling unit can grip, clamp, or support the primary container in order to perform one or more processing operations on the primary container.

Further, the container handling system is able to handle/move an individual primary container within six degrees of freedom relative to the transportation unit The one or more translation and/or rotation operations may include and is not limited to gripping, clamping, supporting, tipping, rotating, spinning, inverting, lifting/lowering, articulating/retracting, orienting, individually or in combination. As such, primary container processing stations are enabled to perform one or more processing operations on properly orientated primary containers. such as and not limited to cleaning, rinsing, filling, capping, labeling, printing, surface treating, measuring, gauging, inspecting, drying, decorating, heating, cooling, illuminating, vibrating; and the like the primary container. The one or more transportation and rotation operations may include infeed and/or outfeed and/or transfer to or between primary container processing stations, or may include holding the primary containers while passing the primary container processing stations.

The container handling units are dynamic and flexible in nature, and can be dynamically controlled using a software program with optional feedback sensing mechanism. Based on various types, shapes and sizes of the primary containers, the container handling units can flexibly and dynamically adapt its handling mechanism and processing mechanism in order to perform handling and processing operations, respectively, on variety of primary containers. To enable this, the container handling units may comprise of a sensing mechanism including one or more sensors in communication with a controlling unit, in an embodiment of the present invention. The sensors may detect the shape and size of the primary container, communicate the same to the controlling unit, which in turn can control and adapt the handling and processing mechanism of the container handling unit depending on the type of primary container. In an embodiment, the sensing mechanism and certain functions of automation may be established locally to the container handling unit and may be in turn report and respond to wirelessly communicated instructions from a central controller responsible for the overall operation. In another embodiment, the controlling unit is situated remotely to the container handling unit, and the container handling unit can thus be remotely controlled. In another embodiment the on board sensing may be used to provide key inputs for process confirmation, status and optimization, as well as for advice of system integrity and condition monitoring. The deterministic wireless machine control system including consideration of synchronized digital input and output signals as well as synchronized analog input and output signals between one or more statically mounted master transmitter/receivers and one or more mobile wireless clients. The wireless telecommunications being transmitted and received by one or more centrally located antenna and/or one or more radiating cable antenna laid parallel to the route of the rail mounted movers and or levitating tiles.

In another embodiment, the controlling unit may employ one or more software algorithms to adaptively control the container handling unit to handle a variety of primary containers.

Furthermore the automation software may be equipped with machine learning such that with appropriate feedback sensing and measurement inputs the software and/or software set points and/or process control parameters are automatically updated for optimum performance. In another embodiment, for dynamically adapting its handling mechanism and processing mechanism, the container handling unit may include only a controlling unit that may further employ one or more software algorithms to adaptively control the container handling unit to handle the variety of primary containers.

Because the container handling units are able to 3-dimensionally handle, transport and rotate, the primary containers, and in addition within multiple degrees of freedom of movement, in order to resultantly perform processing operations on them from any direction and any dimension; and because the container handling units are dynamically flexible and adaptable in its handling and processing mechanisms to handle different types of primary containers, the container handling units of the present invention do not require frequent and regular changing of components, parts, and tools of the container handling units to handle variety of primary containers.

In an embodiment as shown in FIG. 1, a transportation unit 104 includes a number of movers or tiles 106 with the container handling unit 108 mounted on and/or integrated in it. The container handling units 108 enable movement of the primary container within six degrees of freedom opposite an adjacent primary container transportation unit or processing station 102. In an embodiment, the container handling units 108 may include at least one gripper set that further comprises a pair of claws (or fingers) or more, of which at least one claw (or finger) is powered for dynamically gripping or otherwise handling a container. In an embodiment, at least one gripper set is adapted for performing the translation and/or orientation operations on the individual primary container, the translation and orientation operations including and not limited to translating, or off-setting, or inclining, or tilting, or rotating, or inverting, or hinging, or spinning an individual primary container around the X, Y, Z axes.

In another embodiment, the container handling units 108 are adapted for performing the one or more processing operations on the individual primary container, the processing operations including and not limited to orientation sensing, oriented or non-oriented labelling, coding, printing, inspecting, identifying, weighing, treating, surface finishing, heating, cooling, illuminating, vibrating and/or measuring the primary containers in transit, or any combination thereof (eg. orienting the position for labeling vs. the orientation of the artwork on the crown of the container).

In addition to the description of the container handling units 108 as described above, the container handling units 108 are contactless powered (untethered) and wirelessly controlled (untethered) via a remote control unit or a control system 114 and/or a local control function responding to sub-routine instructions from a central control system. The control system 114 wirelessly controls or communicates with the container handling units 108 via a wireless telecommunication channel 112. In an additional embodiment, the container handling units 108 are position sensed. Position sensing with appropriate precision and repeatability may be realized via any established, commercially available product including and not limited to those which utilize methods of optical or magnetic position sensing.

Further, the mover or tile 106 may be magnetically coupled with the transportation unit 104 in a contactless manner. In this embodiment, the transportation unit 104 is also inductively controlled and may have electrical coils, while the mover 106 may be equipped with a permanent magnet for creating an electromagnetic field between the transportation unit 104 and the mover 106. Therefore, the mover 106 moves freely, in an independent motion over the transportation unit 104 under the effect of electromagnetic forces generated due to the electromagnetic coil in the transportation unit 104 and the permanent magnet in the mover 106. In another embodiment of the present invention, the mover 106 is attached with the transportation unit 104, and the transportation unit 104 drives the mover 106 implementing a movement system, such as a linear drive motor, or independent cart, or slides, or tracks, or any other type of driving means adapted to curvilinearly propel the mover in an independent and controlled way.

In an embodiment, the transportation unit 104 may be implemented with inductive cables from which inductive power is transmitted via the movers or levitating tiles 106 to the container handling units 108.

In an embodiment in accordance with the present invention, the processing system 100 may include at least one primary container processing station 102 and a transportation unit 104. The primary container processing station treats (eg. labels, inspects, etc.) primary containers which are individually 3-dimensionally transported and rotated by the container handling units 108. The container handling units 108 are able to infeed and/or outfeed individual primary containers 110, each with the desired orientation, to the processing station, or to pass the containers, each with the required orientation, through the processing station.

In an embodiment, at least one or all of the components of the processing system 100, including the transportation unit 104 with the independent, motion controlled rail mounted movers or levitating tiles 106 and the equally independent, motion controlled rail mounted movers or levitating tiles upon which the container handling units 108 are mounted, along with the likewise potentially independent, motion controlled rail mounted movers or levitating tiles of the main primary container conveying unit 102 or that of the primary container processing station is controlled by the controlling unit 114. The controlling unit 114 may be a local or a remote controlling device or combination thereof, for controlling the operations of the processing system 100, and may be any computing device such as including and not limited to an IPC (Industrial Process Controller), PLC (Programmable Logic Controller), a laptop, a smart phone, a mobile phone, an information pad, a tablet, a phablet, and the like. The controlling unit 114 may wired and/or wirelessly control the overall processing system 100 implementing a wired communication protocol or a wireless communication protocol as required. A wired communication protocol may include and is not limited to cable connections, optical fiber cables, Ethernet, LAN, and the like. A wireless communication protocol may include and is not limited to short range wireless, such as Bluetooth, Infrared, Microwave, narrow through broadband telecommunication, WLAN, WAN, or Internet protocols and the like.

The controlling unit 114 controls the 6-degrees of freedom, synchronized movement of the container handling units 108 relative to that of the main primary container conveying unit 102, or relative to that of the primary container processing station.

In an embodiment for wireless operation control of the mover and/or levitating tile 106 and the container handling unit 108, the mover and/or levitating tile 106 is equipped with a wireless client (telecommunication transmitter/receiver) with antenna for wireless communication via one or more of the communication protocols stated above. Each transportation unit 104 of the mover and/or levitating time 106 and the container handling unit 108 may form a dedicated wireless network within which the mover and/or levitating tile 106 and the container handling unit 108 and the transportation unit 104 may be wirelessly controlled via a data transmission, radiating, leaky cable following the closed loop, virtual closed loop or path of the movers and/or the levitating tiles. Further, in an embodiment, the container handling unit 108 may be independently wirelessly controlled within their own dedicated wireless network.

The components of the processing system 100 communicate bi-directionally with the controlling unit 114 via the communication channel 112, for example a communication fieldbus 112. The controlling unit 114 is installed with a software application 116 that monitors, controls and optimizes operations of the overall processing system 100, including the transportation unit 104 with the movers and/or levitating tiles 106 and the container handling units 108, along with the main primary container conveying unit 102 and/or the primary container processing station/s.

Further, the software application 116, in communication with one or more feedback sensors, may also detect a current position and arrangement of the handling mechanism of the container handling units 108, and may signal the container handling units 108 to adapt or change the current position, route and/or arrangement of the handling mechanism according to the size, shape and design of the primary container and/or the state of other primary containers in traffic and/or the state of one or more of the process stations.

Further, in an embodiment, the transportation unit as a whole 104 is moveable in multiple degrees of freedom with respect to an adjacent primary container transportation unit or processing station 102. The transportation unit 104 may be able to move within six degrees of freedom, relative to the adjacent primary container transportation unit 102 or relative to a primary container processing station, for performing transportation and rotation operations. In an embodiment, the transportation unit 104 is able to translate along, or incline, or to tilt, or to rotate around, one or more of the X, Y, Z axes (pitch, yaw, and roll) and all combinations thereof.

In an embodiment, the transportation unit 104 is able to move along and/or rotate about a vertical axis (Z), e.g. variability in height relative to the adjacent primary container transportation unit or processing station 102, along and/or rotate about a horizontal axis (X), e.g. variability in position in a direction parallel to the adjacent primary container transportation unit or processing station 102 machine direction, and along and/or rotate about a second horizontal axis (Y), e.g. variability in position in a direction perpendicular to an adjacent primary container transportation unit or processing station 102 or processing station machine direction. The transportation unit 104 in the processing system 100 may be closed loop or virtual closed loop or otherwise recirculating system either in series, parallel or in a swarm effect, and not necessary but preferably independent motion controlled cart (mover) (e.g. Linear Drive) and/or levitating tile based.

Figure 2:
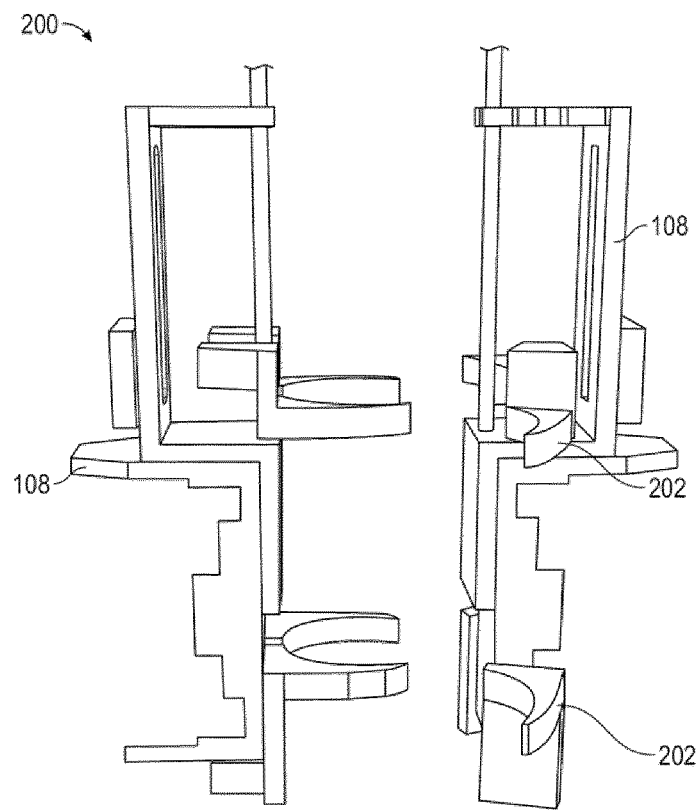
FIG. 2 illustrates an exemplary container handling unit for use in a primary container handling system.

FIG. 2 illustrates a container handling unit 108 for translating and/or rotating a primary container, such as a bottle, from its body. A configuration 200 of the container handling units 108 shows the container handling unit 108 having a set of two, independently height adjustable clamping or gripping means 202, one positioned above the other. The clamping or gripping means 202 is suitable to handle/grip/clamp/ hold or otherwise temporarily attach to the primary container (i.e. a bottle or a can) from its body. It may be appreciated by a person ordinarily skilled in the art that the container handling units 108 may include any suitable number of clamping or gripping means 202, including one clamping or gripping means 202, for translating and/or rotating a primary container from its body depending on the requirement in the processing system 100, and the type of the packaging container being handled or processed, without deviating from the meaning and scope of the present invention.

In an embodiment, one of the clamping or gripping means 202 in the configuration 200 of the container handling unit 108 is attached at the bottom of the container handling unit 108 in a way to support the primary container 110 from its bottom, or to place the primary container 110 over this clamping or gripping means 202. Thus, it may be appreciated by a person ordinarily skilled in the art that the clamping or gripping means 202 can be attached at any position in the container handling unit 108 for handling the primary container 110 from anywhere in its body and its bottom.

Further, the container handling units 108 also include a driving mechanism to control and drive the clamping or gripping means 202. The driving mechanism may be a driving motor. Also, the driving mechanism can be wirelessly controlled via the controlling unit 114, to, in turn, wirelessly control the container handling units 108. The inductive power driving the transportation units 104 is transmitted via the movers 106 to the container handling units 108, and eventually to the clamping means 202 via the driving mechanism.

In an embodiment, the processing system 100 includes two transportation units 104 facing opposite to each other, and where at least one of the transportation units 104 is installed with the container handling units 108 of FIG. 2 for transporting and rotating a primary container 110 from its body. Thus, the two container handling units 108 are driven opposite to each other on the two oppositely facing transportation units 104, and are able to transfer the primary container 110 from one transportation unit to the other in transit while giving it the translation and/or rotation.

It may also be apparent to a person ordinarily skilled in the art, that in the above exemplary environment, the two transportation units 104 may be inclined to each other or to the adjacent primary container transportation unit 102 at any angle including 0°, depending on the requirement in the processing system 100, without deviating from the meaning and scope of the present invention.

It should be noted, that the clamping means 202 of the container handling units 108 are highly flexible, adaptable and dynamically controlled using its sensing mechanism with the controlling unit or driving mechanism, which means the clamping means 202 may adapt and control its handling mechanism to handle/grip/hold/or otherwise temporarily attach to any type and size and shape of primary container 100, for example different sizes and shapes of bottles, cans, boxes, etc. It also should be noted that the driving mechanism may rotate or spin the clamping means 202 that, in turn, rotates or spins the primary container 110 in any angle, in any dimension, or in any plane. For example, the driving mechanism may rotate or spin the clamping means 202 that, in turn, rotates the primary container 110 at a required angle.

Figure 3A:
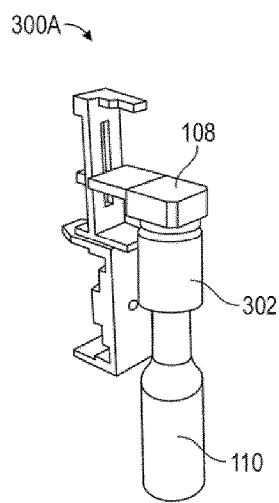
FIGS. 3A-3B-3C illustrate an exemplary container handling unit for use in a primary container handling system for 3-dimensionally translating and/or rotating a primary container, such as a bottle, from its top.
Figure 3B:
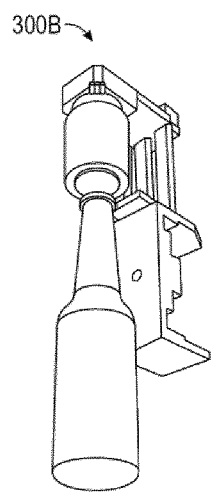

FIGS. 3A and 3B illustrate an exemplary container handling unit 108 for translating and/or rotating a primary container, such as a bottle, from its top, in accordance with an embodiment of the present invention. An exemplary configuration 300A and 300B of the container handling units 108 shows the container handling unit 108 having a clamping or gripping means 302. The clamping or gripping means 302 is suitable to handle/grip/clamp/hold the primary container (i.e. the bottle) from its top, e.g. a cap, cork, crown, or rim gripper, or a pneumatic or electric tulip. A perspective and a bottom view of the configuration with the clamping means 302 can be seen in configuration 300A and 300B, respectively.

Figure 3C:
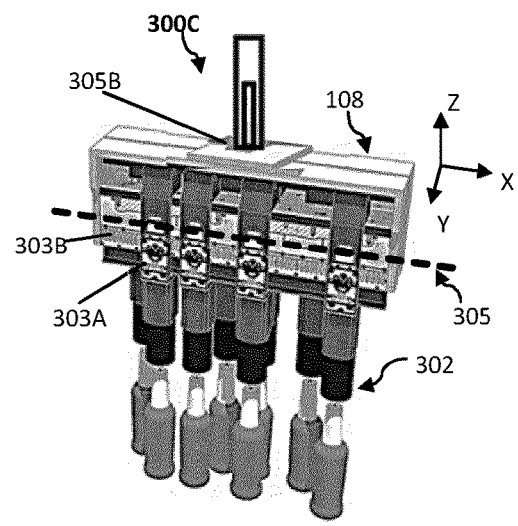

FIG. 3C shows a container unit for 3-dimensionally translating and/or rotating a primary container, the container handling unit 108 comprising a plurality of clamping or gripping means 302 enabling 3-dimensional translation and/or rotation of more than one individual primary container simultaneously.

Specifically, the container handling unit is configured to translate the primary container in an X direction. The X direction may be a horizontal axis, which may be parallel to a machine direction. Translation in the X direction may be enabled using a linear motor system. For example comprising linear movers 303A mounted on a stator rail 303B forming part of the container handling unit 108.

The container handling unit 108 of FIG. 3C is further configured to translate the primary container in a Y direction (e.g. along a horizontal axis perpendicular to the X axis, which may be perpendicular to a machine direction). In the present example, this is achieved by actuating a mechanism configured to move the two stator rails 303B shown in FIG. 3C together and further away from each other. Movement in the Y direction may also be achieved by mounting the first set of stator rails 303B on movers of a second linear motor system.

The container handling unit 108 of FIG. 3C is further configured to translate the primary container in a Z direction. The Z direction is a vertical direction, perpendicular to the X and Y axes. This vertical movement may be achieved as described elsewhere herein. As an example, the container handling unit 108 may comprise an actuator for raising or lowering individual primary containers relative to the stator rails 303B, or the stator rail 303B as a whole may be configured to raise a plurality of primary containers simultaneously.

The gripping means 302 of FIG. 3C are also configured to rotate the primary container about the Z axis (i.e. a vertical axis). This may be achieved by locating a motor inside each of the grippers 302, for example.

In some examples, the gripping means 302 of FIG. 3C may be rotatable about the X axis by means of a motor (not shown) located in the housing of the container handling unit 108, arranged to rotate the linear stator rail 303B about the axis 305 shown. In other examples, corresponding motors may be located to rotate the linear stator rail 303B about the Y axis.

Each of the above-described movements can be executed and controlled independently from the other movements. Additionally, the extent of each movement can be continuously varied. That is, the user can select the extent of each movement from a continuous range, rather than being forced to select from a limited number of discrete options.

Each clamping or gripping means 302 is moveable fixed, preferably on rail mounted movers integrated in the container handling unit, and is adapted to individually translate and rotate each primary container. The latter configuration may enable picking a number of primary containers and grouping or re-grouping and/or orientating it within the container handling unit while transporting and before dropping. In other examples the container handling unit 108 may comprise only a single gripper to handle a single primary container.

The exemplary configuration of the container handling unit 108 with the clamping means 302 is suitable for handling and transporting the primary container, such as the bottle 110, by embedding the container 110 from the top. The container handling unit 108 in such configuration may also include a driving mechanism, such as a driving motor. The driving mechanism may rotate or spin the clamping means 302 that, in turn, rotates or spins the primary container 110 in any angle, in any dimension, or in any plane. For example, the driving mechanism may rotate or spin the clamping means 302 that, in turn, spins the primary container 110 upside down.

Because the clamping means 302 is highly flexible and adaptable and dynamically controlled, any type, size and shape of the primary container 110 can be handled from the top implementing the clamping means 302.

The container handling unit 108 also includes articulating tooling which can perform translation and/or rotation operations on the primary container 110. In this embodiment, a tool may be a craw or finger type gripping means, which is controlled by a driving mechanism, or a driving motor. The articulation is controlled by a driving mechanism, or a driving motor.

The driving inductive power driving the transportation units 104 is transmitted via the movers 106 to the container handling units 108, and eventually to the craw type tool via the driving mechanism.

The articulated tooling in this embodiment of the container handling unit 108 may be suitable for performing transportation and rotation operations such as including and not limited to translating, tipping, inclining, inverting, or raising, or declining the primary container 110. For example, the craw or finger type tool with the driving mechanism is suitable for tipping of the primary container 110.

Figure 4:
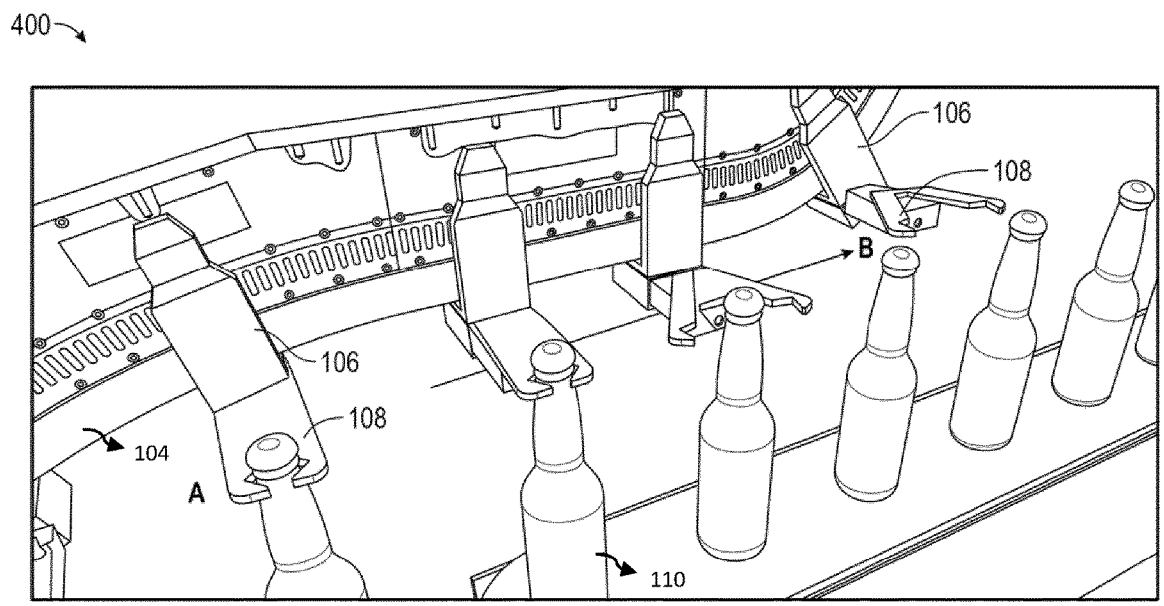
FIG. 4 illustrates position and inclination of the container handling units relative to movers and to the transportation unit, during outfeed and infeed turns of the transportation unit respectively.

FIG. 4 illustrates position and inclination of the container handling units 108 relative to the movers 106 and to the transportation unit 104, during outfeed turn of the transportation unit 104 respectively. FIG. 4 shows an environment 400 illustrating an outfeed turn of the transportation unit 104. At point 'A', which is the innermost point (at inner curve) during the outfeed turn, the container handling unit 108 and the movers 106 are inclined at the same angle with respect to the transportation unit 104 to grip the primary container 110 firmly at the curve of the transportation unit 104. Whereas, at point 'B', which is the outer point most (at outer curve) during the outfeed turn, the container handling unit 108 and the movers 106 are inclined at different angle with respect to the transportation unit 104. At point 'B', the mover 106 turns according to the outer curve of the transportation unit 104 for traversing the same curve as traversed by the transportation unit 104, while the container handling unit 108 changed its orientation (from the point A) and is horizontally positioned in the horizontal plane now, parallel to the plane of movement of the primary container 110. Due to this change in orientation of the container handling unit 108 to be in parallel plane of the moving primary container 110, the clamping means is horizontally positioned relative to primary container 110 and is able to properly grip the primary container 110 from the neck/collar.

In an embodiment, for an infeed turn of the transportation unit 104, at an outer most point (at outer curve) during the infeed turn, the container handling unit 108 and the movers 106 are inclined at different angle with respect to the transportation unit 104. At this point, the mover 106 turns according to the outer curve of the transportation unit 104 for traversing the same curve as traversed by the transportation unit 104, while the container handling unit 108 is horizontally positioned in the horizontal plane parallel to the plane of movement of the primary container 110. Due to this change in orientation of the container handling unit 108 to be in parallel plane of the moving primary container 110, the clamping means is horizontally positioned relative to primary container 110 and is able to properly grip the primary container 110 from the neck/collar. Whereas, at an inner point (at inner curve) during the infeed turn, the difference between the inclination of container handling unit 108 and the inclination of movers 106 with respect to the transportation unit 104 has reduced than the difference between the inclinations at this point, and the container handling unit 108 is maintain the orientation according to the plane of movement of the primary container to grip the primary container 110 firmly at the curve of the transportation unit 104. A benefit thereof is for example that the primary container hangs vertical while the mover negotiates radii and inclinations changing the elevation of the primary container. The pivot action may be motion controlled or simply act under the influence of gravity on the mass of the primary container, if the inclination for elevation or lowering is vertical.

Figure 5:
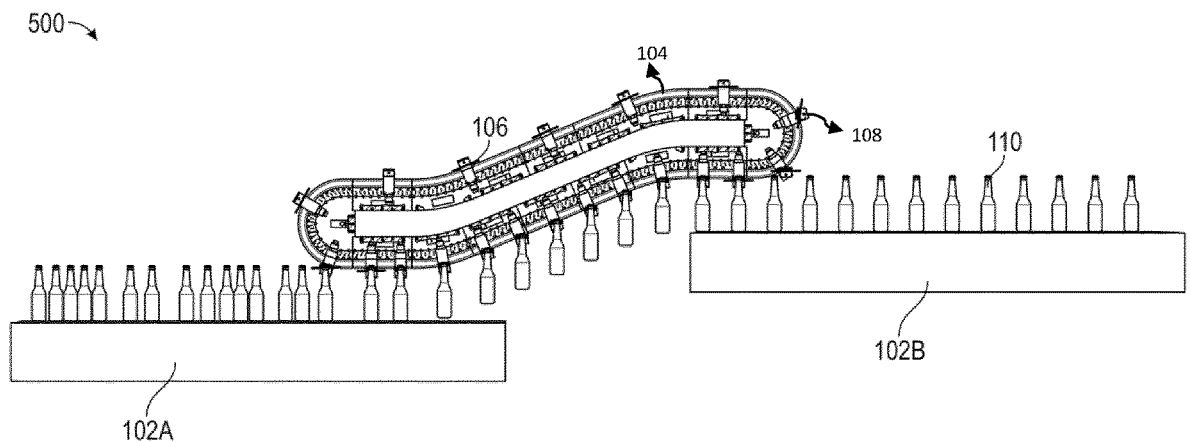
FIG. 5 illustrates a primary container processing system comprising a primary container handling system performing translation and/or rotation operations.

FIG. 5 illustrates an exemplary environment of the processing system 500 performing 3-dimensional translation and/or rotation operations including selection and gripping, elevation and pitching on the primary container 110, such as a bottle, in accordance with an embodiment of the present invention. The exemplary environment 500 shows the processing system 100 including one transportation unit 104 equipped with multiple movers 106 mounted with multiple container handling units 108. The container handling units 108 are adapted to perform translation and/or rotation operations such as selection and gripping of the primary containers 110 in transit moving at the adjacent primary container transportation unit 102A, then perform the handling operation of rotating while lifting or elevating the primary containers 110, to eventually perform the handling operation of pitching and dropping the primary containers 110 at the adjacent primary container transportation unit 102B. Thus, the processing system 100, in exemplary environment 500, picks the containers from a lower elevated plane of one main primary container conveying unit 102A and elevates and drops the containers properly orientated to a higher elevated plane of other main primary container conveying unit 102B.

It may be apparent to a person ordinary skill in the art that the processing system 100 may also pick the containers from a higher elevation of one main primary container conveying unit and lower and drop the containers to a lower elevation of other main primary container conveying unit.

Figure 6:
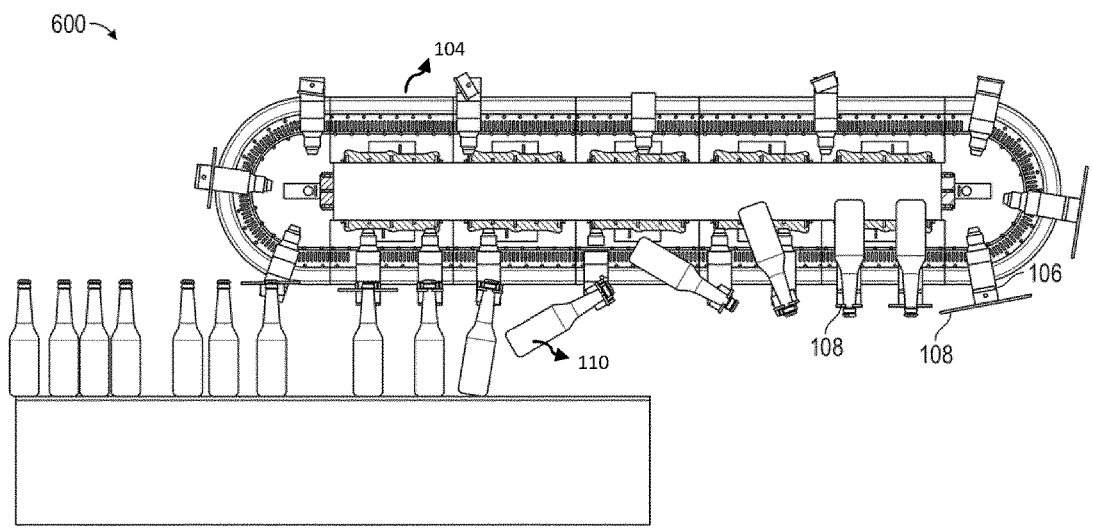
FIGS. 6-7 show different views illustrating a primary container processing system comprising a primary container handling system performing translation and/or rotation operations, such as inverting of the primary container.
Figure 7:
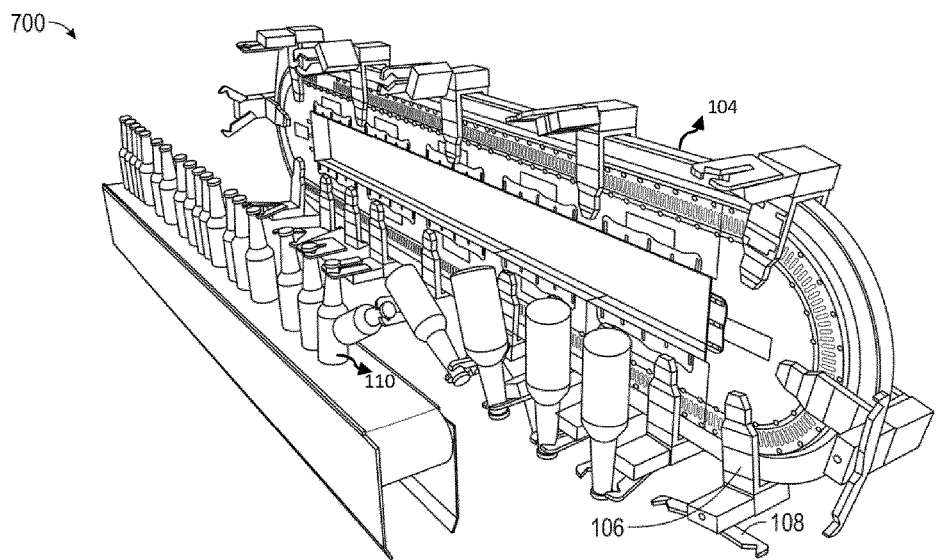

FIGS. 6-7 show different views illustrating an exemplary environment of the processing system 600 and 700 performing translation and/or rotation operations such as transporting while inverting the primary container 110, e.g. a bottle, in accordance with an embodiment of the present invention. These figures show a primary container processing system including one transportation unit 104 equipped with multiple movers 106 mounted with multiple container handling units 108. The container handling units 108 in the environment 600 perform the translation and/or rotation operations such as inversion of the primary container 110, e.g. a bottle or a can.

Figure 8:
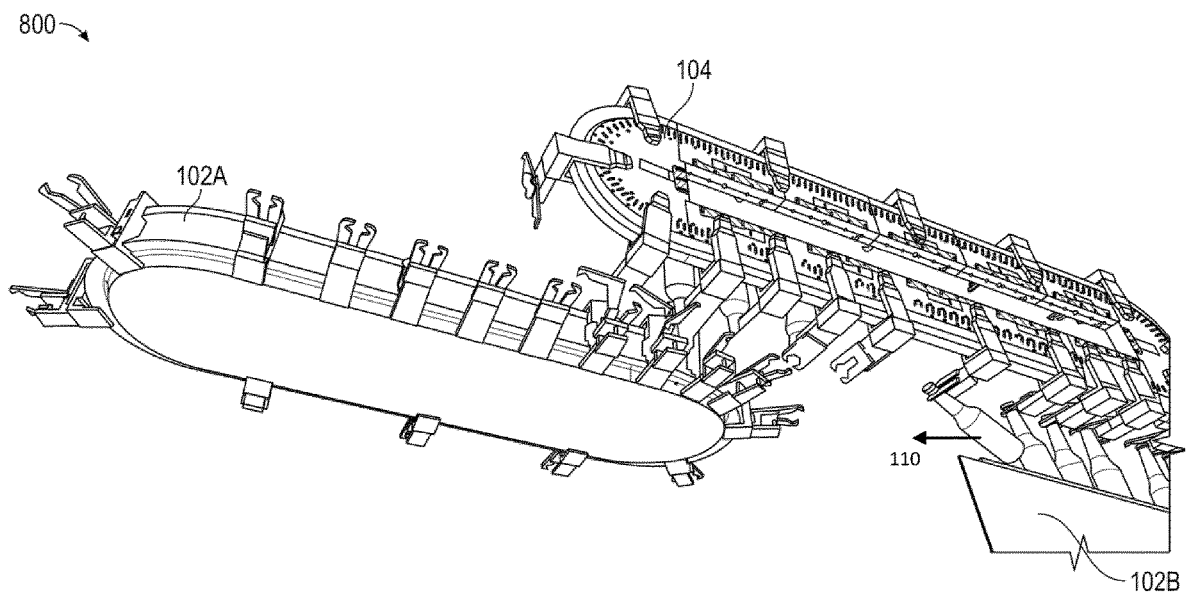
FIG. 8 shows a bottom view illustrating an exemplary environment of a primary container processing system according to the present invention wherein the primary container handling system is translating and/or rotating the primary containers from an adjacent conveying unit to a primary container processing station, where the adjacent primary container transportation unit and the processing station are in different planes.

FIG. 8 shows a bottom view illustrating an exemplary environment of the primary container processing system 800 performing translation and/or rotation operations such as inverting of the primary container 110, e.g. a bottle or a can, and simultaneously transporting the primary container 110 from an adjacent primary container transportation unit 102B to another adjacent primary container transportation unit or processing station 102A, where 102A and 102B are in different planes.

Thus, advantageously, the container handling units 108 mounted on the independently controlled movers 106 are able to perform one or more translation and/or rotation operations such as gripping from any directions or sides of the primary container 110 and moving in multiple degrees of freedom, such as gripping and rotating in any angle, or gripping and lifting or lowering in Z axis relative to the adjacent primary container transportation unit or processing station 102, or such as gripping and moving closer or far from a plane along a horizontal axis (Y) e.g. variability in position in a direction perpendicular to the adjacent primary container transportation unit 102 machine direction, or such as gripping and moving in or opposite to the adjacent primary container transportation unit 102 machine direction, i.e., along a horizontal axis (X). In addition, the container handling units 108 are able to transport the primary containers within different planes. Resultantly, the container handling units 108 are able to cooperate in a variety of processing steps such as cleaning, rinsing, filling, capping, labeling, printing, coding, decorating, inspecting, collating, laning, grouping etc. requiring individual primary container transport and rotation, and in multiple degrees of freedom.

Further, because the container handling units 108 are highly flexible and adaptable according to different types of primary containers, different diameter, shape, size, height etc. of the primary containers, the processing system 100 do not require changing parts or components of the container handling units 108 depending on different types, shape, size, etc. of primary containers. Also, because changing parts of the container handling units 108 and other machine architectures is avoided in the present invention, it reduces bulkiness and complexity of the architectures, thus improving visibility and access of each component of the processing system 100 while simplifying machine construction.

The disclosure provides integration of multiple conveying functions into smaller, faster, highly flexible, adaptable, compact units, saving space while improving capacity, productivity, quality, and performance, while enabling real time individual product tracking capability and enhanced process control. The net result being that higher through put of a greater range of stylized products may be realized for a reduced size and number of machines.

The container handling units 108 include adaptable mover and tooling suitable for variety of ranges (families) of containers.

The container handling units 108 provide a variety of functions, such as translating and/or rotating the packaging containers or any combination thereof, which may include collecting, transferring, delivering, collating, laning, sorting, offsetting, grouping, pitching etc. The container handling units 108 also provide capability in performing manipulation operations on the packaging containers such as including buffering, aligning, singling, separating, grouping, pitching, synchronizing, sorting, merging, re-ordering, sequencing. Also, the container handling units 108 also provide performing processing operations on the packaging containers such as including gripping, manipulating, transferring, rotating, aligning, adjusting, and orientating.

Because the container handling units 108 are highly flexible, adaptable and dynamically programmable, they perform handling and processing operations by handling the packaging containers gently in a controlled acceleration, deceleration, while avoiding shocks or sudden impacts to the primary containers. Also, the container handling units 108 avoids shear forces on the packaging containers, and hence avoids rubbing, or chafing or destroying the surfaces of the packaging containers, thereby also protecting the labels on the packaging containers. Further, the container handling units 108 convey or transport the packaging containers smoothly without pressure, avoiding gearing/sprocket effects.

The position and inclination, and range of the transportation system and container handling units 108 and the mover and levitating tiles 106 may be automatically adjusted.

The processing system 100 can replace conventional processes such as including and not limited to single filer, scroll replacement, star wheel & guide replacement and pedestal elimination. The processing system 100 provides process to process transfer, through process handling, networking (dynamic switching, sorting, routing), buffering (1st in, 1st out).

Primarily, the processing system 100 is applicable to a wide range of applications. The container handling units 108 including the independent, motion controlled movers, levitating tiles and tooling may be auto adjusted or auto exchanged to quickly accommodate and handle a wide range of type, shape, size and height of primary product container, may also not be round nor of constant cross section). Further, the processing system 100 provides for automated changeover with execution occurring and being completed within seconds of changeover instruction via the HMI. The movers and or levitating tiles 106 adjust in position to the revised process, format and/or size of the primary container to be handled.

Furthermore, the processing system 100 may adapt new formats that may be accommodated via software programming which are faster to implement, adjust and update, plus may be implemented independent of the equipment OEM. Also, the processing system 100 has short lead times, because new introductions, changes and updates may be executed at short notice and within a short time frame.

Moreover, the processing system 100 may include reduced handovers, where the handovers of primary product containers from one device to another is reduced as the container handling via tooling on the movers and/or levitating tiles of the independent, motion controlled transportation systems transfer the product from the transportation system into the machine, through the machine and discharge onto the discharge transportation system, or hand off directly to another machine without giving up control to a general conveying device and having to regain pressure, pitch and timing control for infeed into the following process (eg. by further action of conveyor transfers, speed regulation, exposure to line pressures, recirculation, one or more timing scrolls and the series of star wheels and guides etc.

Advantageously, the processing system 100 provides for faster changeovers, higher productivity, as HMI directed automatic machine adjustments executed within seconds without personnel input nor exchange of format specific change parts. Also, the independent motion controlled movers or levitating tiles of the present smart processing system 100 are position settable.

Because the processing system 100 is not restricted to specific type and shape and size of packaging container, it may also provide non-circular primary handling. Programmable machine and tooling control enables ease of handling non-round primary containers and packaging, respectively (eg. obround, square, triangular, polygon, trapezium parallelogram, shapes), as well as shapes which are not of constant geometry.

The processing system 100 is faster, more compact, versatile, and can grip, lift/lower, rotate, orientate, invert, index, the containers, while executing in variable motion such as can pause, accelerate, decelerate, move in variable speed motion, also synchronize, and bypass, in addition can handle malfunction incidences (have redundancy). The processing system 100 assures line sanitization, in process tracking and tracing, can provide changeover on the fly and eliminate conveyors which block access about factory and which take up extensive amounts of space.

The invention claimed is:

1. A primary container handling system comprising:
    a transportation unit transporting at least one container handling unit mounted on at least one independently motion controlled mover or levitating tile,
    said container handling unit being configured to provide 3-dimensional translation and/or rotation of an individual primary container;
    wherein 3-dimensional translation and/or rotation comprises movement in at least three of the following six degrees of freedom:
        translation along a X axis, parallel to a machine direction of the system;
        translation along a Y axis, perpendicular to the X axis;
        translation along a Z axis, perpendicular to the X and Y axes;
        rotation about the X axis;
        rotation about the Y axis; and
        rotation about the Z axis; and
    wherein the container handling unit is configured to provide movement in each of the degrees of freedom in which movement is provided independently of movement in any of the other degrees of freedom.

2. The system according to claim 1, wherein the container handling unit comprises a gripper for at least temporarily holding and releasing an individual primary container.

3. The system according to claim 1, wherein the container handling unit comprises a plurality of grippers, each gripper being adapted to individually translate and/or rotate within the container handling unit.

4. The system according to claim 2, wherein the gripper comprises at least one gripper set comprising a set of fingers or claws of which at least one is actuated to dynamically grip, clamp or hold the primary container.

5. The system according to claim 1, wherein the 3-dimensional translation and/or rotation of an individual primary container comprises:
    translation along and/or rotation about the X axis; and
    translation along and/or rotation about the Y axis; and
    translation along and/or rotation about the Z axis.

6. The system according to claim 1, wherein the extent of translation or rotation is selectable from a continuous range of possible translations or rotations.

7. The system according to claim 1, wherein the 3-dimensional translation and/or rotation is relative to the at least one independently motion controlled mover or levitating tile on which the container handling unit is mounted.

8. The system according to claim 1, wherein the transportation unit is configured to move relative to an adjacent primary container transportation unit, or relative to a primary container processing station.

9. The system according to claim 1, wherein the container handling units are wirelessly controllable and/or wireless powered and/or position sensed.

10. The system according to claim 1, comprising a control system enabling the control of the 3-dimensional movement of the individual primary containers relative to an adjacent primary container transportation unit, or relative to a primary container processing station.

11. The system according to claim 1, wherein the container handling unit comprises a control system configured to receive instructions and actuate the container handling unit to translate and/or rotate the individual primary container.

12. A primary container processing system comprising a primary container handling system in accordance with claim 1, and further comprising at least one adjacent primary container transportation unit and/or at least one primary container processing station; wherein the transportation unit is configured to move relative to the primary container processing station.

13. The primary container processing system according to claim 12, wherein said primary container processing station comprising a transportation unit transporting a number of container processing units, each container processing unit of which being mounted on or integrated into independently motion controlled, rail mounted, movers or levitating tiles and the mounting of each container processing unit having means for up to 3-dimensional translation and/or orientation of an individual container processing unit, relative to the rail mounted mover or levitating tile.

14. The system according to claim 2, wherein the gripper is adapted for primary container neck and/or body gripping and/or top gripping and/or bottom gripping/supporting.

* * * * *